United States Patent [19]

McNeill et al.

[11] 4,001,358

[45] Jan. 4, 1977

[54] APPARATUS AND METHOD FOR FORMING A CEMENTITIOUS CONDUIT IN SITU

[75] Inventors: Charles T. McNeill; Melba F. Silva, both of Yuba City, Calif.

[73] Assignee: No-Joint Concrete Pipe Co., Yuba City, Calif.

[22] Filed: Feb. 7, 1975

[21] Appl. No.: 548,105

Related U.S. Application Data

[63] Continuation-in-part of Ser. No. 256,891, May 25, 1972, abandoned.

[52] U.S. Cl. .................... 264/33; 264/312; 425/59; 425/64
[51] Int. Cl.² ........................................ E03F 3/06
[58] Field of Search ............. 425/59, 64, 426, 427, 425/262; 264/33, 312

[56] References Cited

UNITED STATES PATENTS

| | | | |
|---|---|---|---|
| 2,734,248 | 2/1956 | Gaudin | 425/59 |
| 3,096,556 | 7/1963 | Woods | 425/262 |
| 3,193,901 | 7/1965 | Lee | 425/59 |
| 3,534,449 | 10/1970 | Blixt | 425/200 |
| 3,551,537 | 12/1970 | Thomason | 425/59 X |

FOREIGN PATENTS OR APPLICATIONS

| | | | |
|---|---|---|---|
| 645,213 | 7/1962 | Canada | 425/59 |
| 480,184 | 4/1953 | Italy | 425/427 |

Primary Examiner—Robert D. Baldwin
Attorney, Agent, or Firm—Phillips, Moore, Weissenberger, Lempio & Strabala

[57] ABSTRACT

A cementitious conduit is formed in situ in a ditch or the like by defining an elongated volume of annular cross-section within the ditch with the axis of elongation of the annular volume extending along the ditch and with one end of the annular volume closed and the other end thereof open. A solidifiable cementitious material is introduced into the annular volume at the closed end thereof and such cementitious material is continuously urged to move toward the open end thereof at a rate at least equal to a given rate. Simultaneously, the volume is moved along the ditch at such given rate with the closed end thereof preceding the open end thereof and circumferential frictional forces are applied to the cementitious material at the inner surface of such annular volume. According to a preferred embodiment of the apparatus for practicing this invention, the inner boundary of the annular volume is defined by two axially aligned cylindrical members in abutting end-to-end relation and the outer boundary of the annular volume is defined in part by the walls of the ditch and in part by a generally horizontal member closing the opening of the ditch over such cylindrical members and the cylindrical members are designed so that, by counter rotating the cylindrical members with respect to each other, the cementitious material is continuously urged to move toward the open end of the annular volume and circumferential frictional forces are applied thereto at the inner surface of such volume.

25 Claims, 15 Drawing Figures

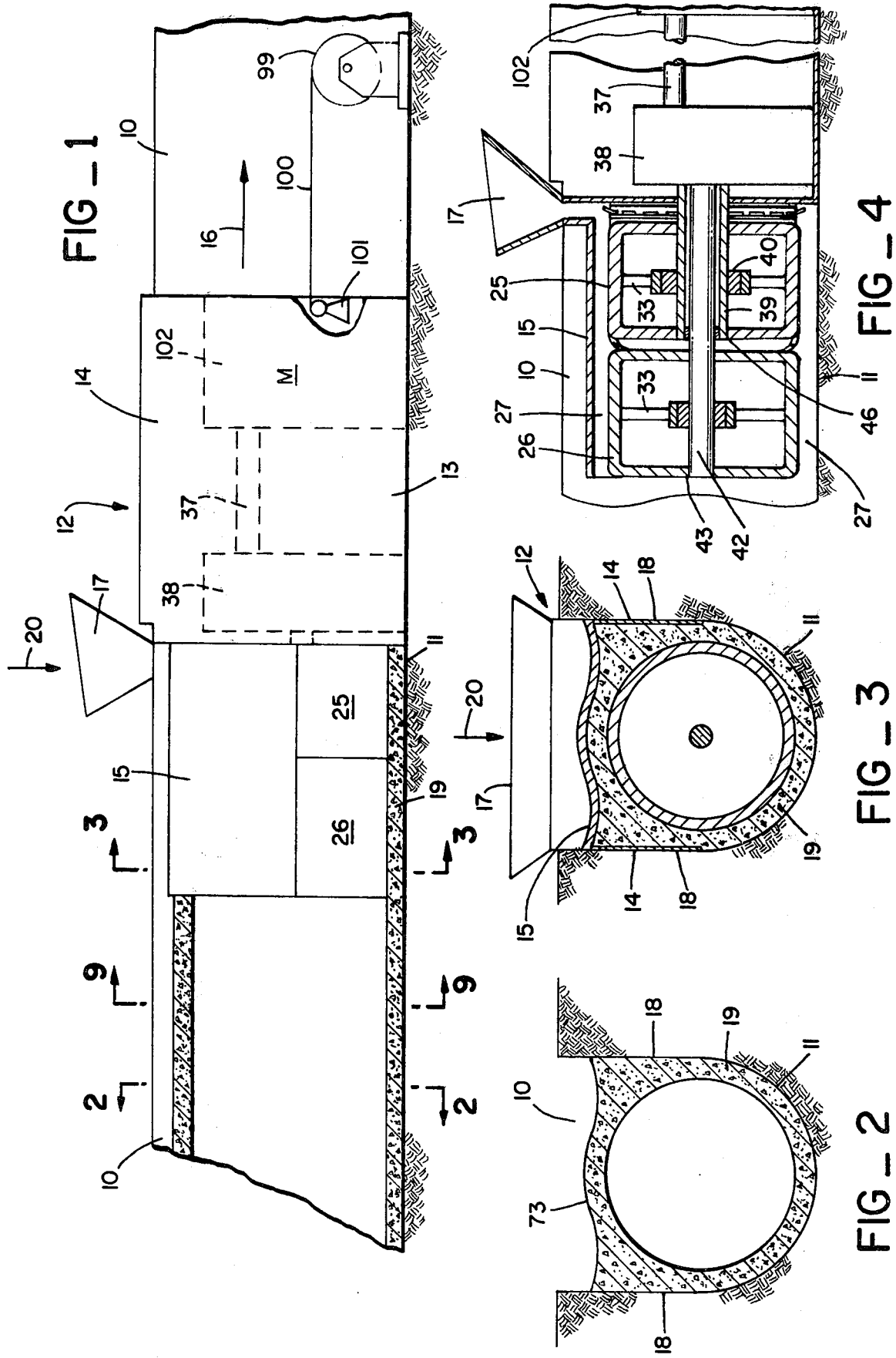

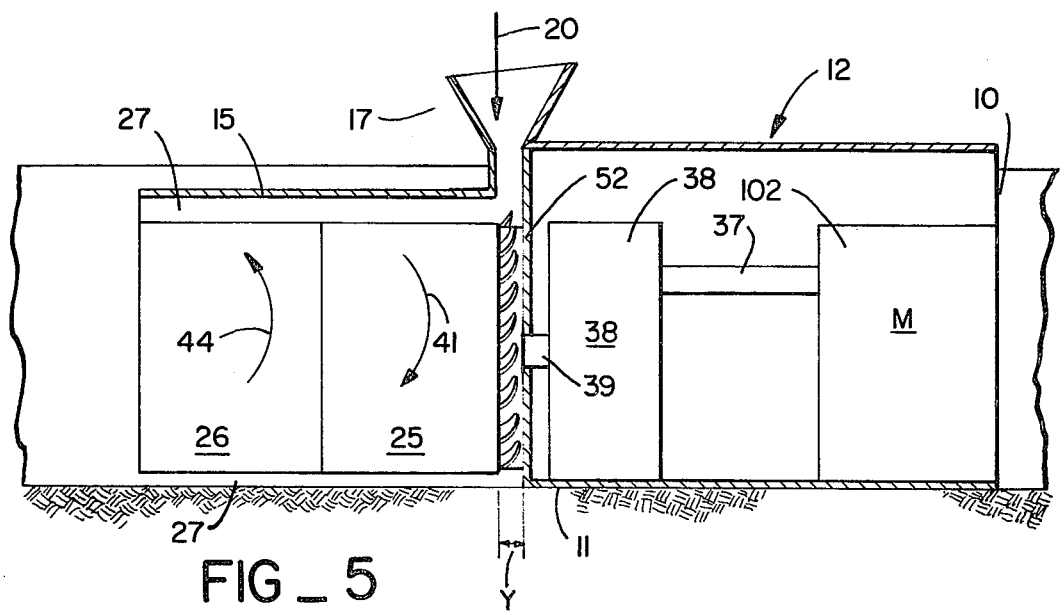
FIG_5
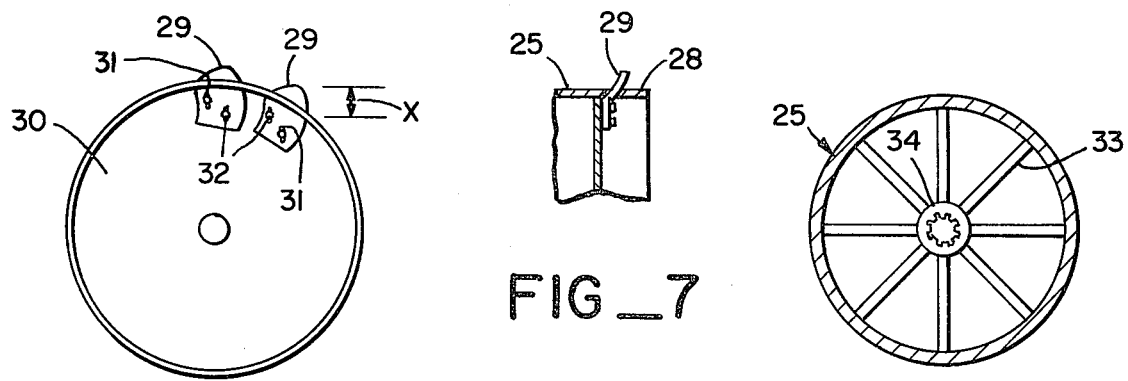
FIG_6  FIG_7  FIG_8
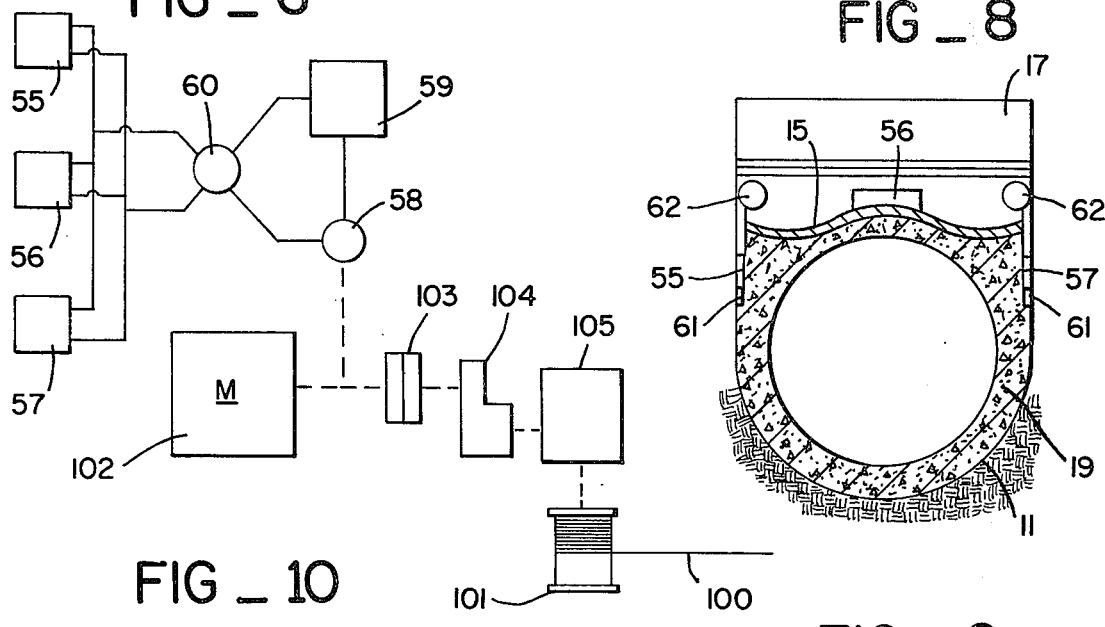
FIG_10  FIG_9

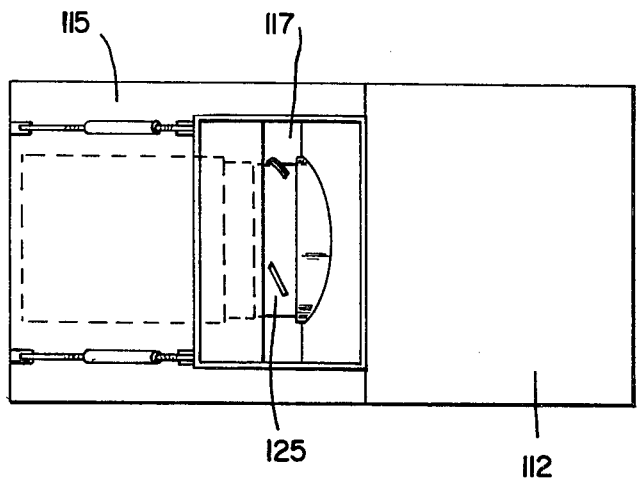
FIG_12
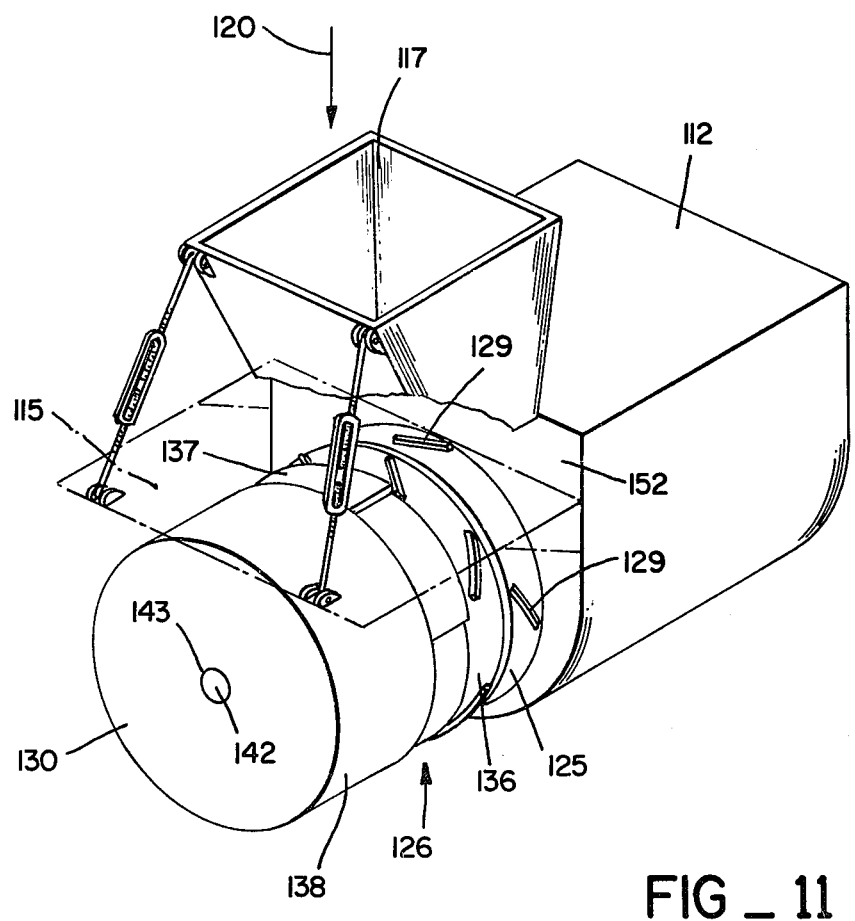
FIG_11

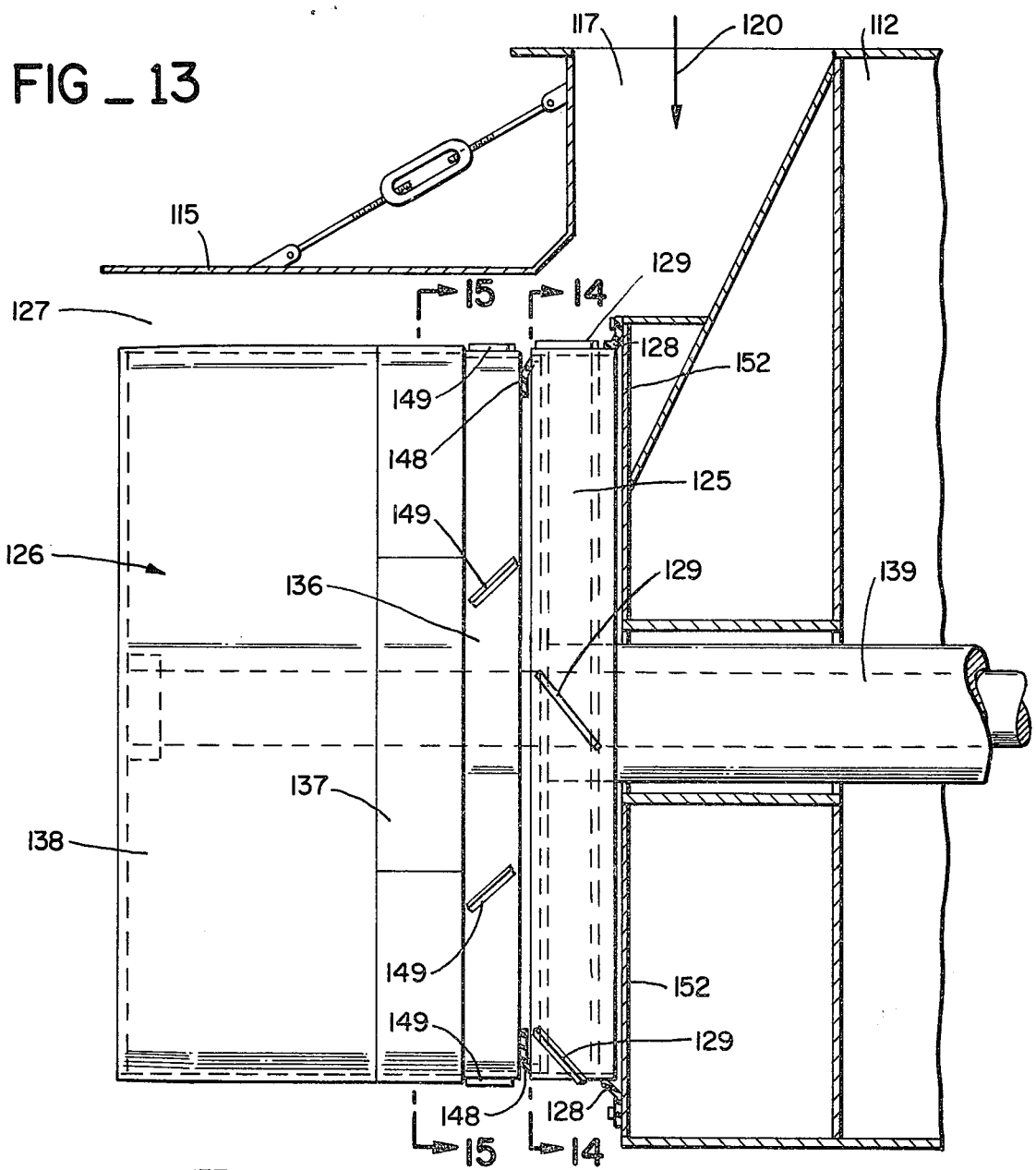
FIG_13
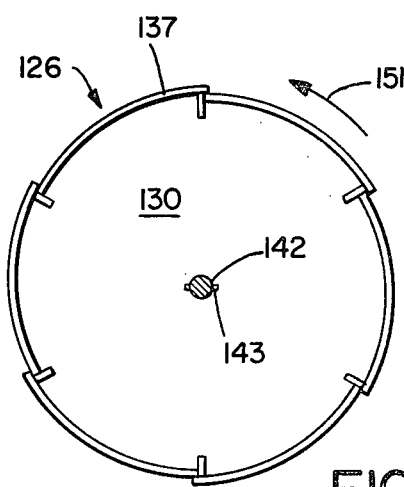
FIG_15
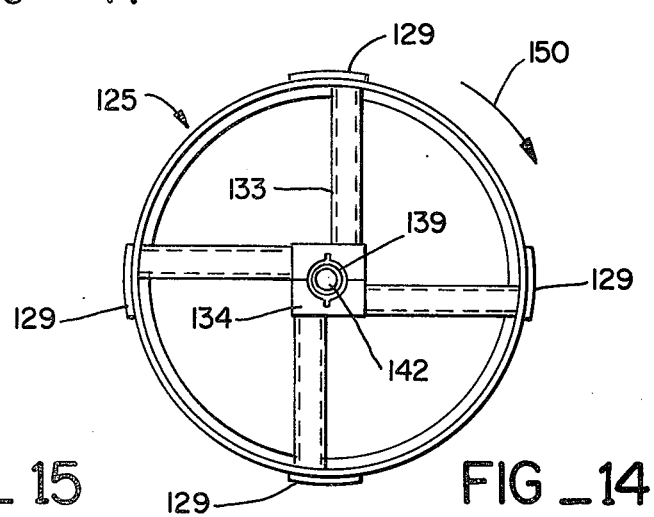
FIG_14

4,001,358

APPARATUS AND METHOD FOR FORMING A CEMENTITIOUS CONDUIT IN SITU

CROSS-REFERENCE TO RELATED APPLICATIONS

This application is a continuation-in-part of the prior co-pending application of the inventors hereof, Ser. No. 256,891, filed May 25, 1972 and entitled "Apparatus and Method For Forming a Cementitious Conduit In Situ", now abandoned.

BACKGROUND OF THE INVENTION

1. Field of the Invention

The invention relates to the formation of concrete pipe; and more particularly, to apparatus and method for forming continuous and seamless concrete pipe in situ in a ditch or the like.

2. Description of the Prior Art

It has been suggested that concrete pipe be formed in situ in ditches or the like using machines such as those described in U.S. Pat. Nos. 3,534,449 and 2,731,698. Although the pipes formed by such machines are satisfactory from a structural strength point of view, such pipes are produced using forms or the like which are removed after formation of the pipe and prior to utilization thereof. Such forms are necessary in order to form a pipe which is generally cylindrical and wherein the top half is as strong as the bottom half. Further, since the forms must be removed so that they do not impede the subsequent flow of fluids or the like through the completed pipes, time and labor are involved both in their placement and in their removal. Also, the area of the pipe at the lower edges of the forms are left rough which, although not pertinent from a structural point of view, results in a pipe having an interior not completely smooth and thus tending to affect the flow characteristics of the pipe.

SUMMARY OF THE INVENTION

It is an object of this invention to provide an improved apparatus and method for forming smooth-walled concrete pipe in situ.

It is a further object of this invention to form such pipe in a manner eliminating the need for placement and subsequent removal of interior forms or the like.

These and other objects are preferably accomplished by the steps of defining and elongated volume of annular cross-section within a ditch with the axis of elongation of the annular volume extending along the ditch and with one end of the annular volume closed and the other end thereof open, introducing a solidifiable cementitious material into such annular volume at the closed end thereof, applying frictional forces to said cementitious material at said closed end in a first circumferential direction, said forces having axial components continuously urging such solidifiable cementitious material to move toward the open end of the annular volume at a rate at least equal to a given rate, and, simultaneously, moving the annular volume along the ditch at such given rate with the closed end of the annular volume preceding the open end thereof and applying frictional forces in the opposite circumferential direction to the solidifiable cementitious material at the inner surface of the balance of such annular volume. A preferred embodiment of the apparatus for forming cementitious conduit in a ditch according to this invention comprises a movable support means slidably received on the sides and bottom of said ditch, a hollow drive shaft mounted on such movable support means and projecting therefrom within and along such ditch, a second drive shaft mounted on such movable support means within such hollow drive shaft, such second drive shaft being coaxial with the hollow drive shaft and projecting therefrom along and within such ditch, a first cylindrical member mounted on such hollow drive shaft coaxially therewith, a second cylindrical member mounted on the second drive shaft coaxially therewith and in end-to-end close-spaced relation with the first cylindrical member, said first and second cylindrical members having substantially equal diameters, a generally horizontal skirt member mounted on such movable support means and dimensioned to close the opening of such ditch above such first and second cylindrical members to thereby define with said cylindrical members and the sides and bottom of such ditch a volume of annular cross-section, a rigid wall member mounted on such movable support means and joined to the skirt member in close-spaced relation to the free end of the first cylindrical member and slidably abutting the sides and bottom of the ditch to thereby close one end of such annular volume defined thereby, means for introducing solidifiable cementitious material into such annular volume through such skirt member adjacent such rigid wall means, drive means mounted on such movable support means and coupled to such hollow drive shaft and second drive shaft for rotating said drive shafts in opposite directions with respect to each other about their common axis to thereby counterrotate said cylindrical members with respect to each other, means on the exterior surface of such first cylindrical member for continuously urging such solidifiable cementitious material to move away from such rigid wall member and toward the open end of such annular volume at a rate at least equal to a given rate upon rotation of such first cylindrical member, means on the exterior surface of the second cylindrical member for applying frictional force to the cementitious material and means associated with such movable support means for moving such movable support means along such ditch at such given rate with the closed end of such annular volume preceding the open end thereof.

BRIEF DESCRIPTION OF THE DRAWING

The foregoing and other objects and features of this invention will be more fully understood from a reading of the following detailed description in conjunction with the appended drawings wherein:

FIG. 1 is a side view in elevation of apparatus according to one embodiment of the teaching of this invention disposed in a ditch or the like with the conduit formed thereby and the ditch shown in cross-section;

FIG. 2 is a cross-sectional view taken along lines 2—2 of FIG. 1;

FIG. 3 is a cross-sectional view taken along lines 3—3 of FIG. 1;

FIG. 4 is a fragmentary cross-sectional view showing only the cylindrical members of the apparatus of FIG. 1 with the drive means for counter-rotating such cylindrical members with respect to each other indicated schematically;

FIG. 5 is a vertical, partly sectional view similar to FIG. 1, showing the inner portions of a preferred embodiment of the apparatus according to this invention in greater detail;

FIG. 6 is a front view of the leading end of one of the drums of the apparatus of FIG. 5;

FIG. 7 is a side view in section of the leading end of the drum of FIG. 6;

FIG. 8 is a vertical, partly sectional view showing the internal structure of a drum of FIG. 5;

FIG. 9 is a view similar to FIG. 3 but showing the location of vibrating mechanisms which may be used in embodiments of this invention;

FIG. 10 is a schematic and diagrammatic view showing the various component parts of the drive and vibrator mechanisms and other operating mechanisms of the apparatus of FIG. 1 modified as shown in FIG. 9;

FIG. 11 is a perspective view of another preferred embodiment of this invention as actually built and tested with a portion thereof shown in phantom;

FIG. 12 is a reduced top view of the embodiment of this invention shown in FIG. 11;

FIG. 13 is an enlarged vertical, partly sectional view similar to FIG. 5 of the embodiment of FIG. 11 with the forward portion of the support means broken away;

FIG. 14 is a reduced cross-sectional view taken along the lines 14—14 of one of the drums of FIG. 13; and FIG. 15 is a reduced cross-sectional view taken along lines 15—15 of the other of the drums of FIG. 13.

DETAILED DESCRIPTION OF PREFERRED EMBODIMENTS

Referring to FIG. 1 of the drawing, a ditch 10 which has been previously formed or dug in the ground and in which it is desired to form the conduit is shown in section. Ditch 10 has a bottom portion 11 (FIG. 2) which is shaped to conform to part of the conduit to be cast directly in situ. A movable support means or sled 12 (FIG. 1) having a curved bottom 13 and vertical sides 14 is disposed in the ditch 10. Sled 12 is similar to that disclosed in the aforementioned U.S. Pat. Nos. 3,534,449 and 2,731,698 excepting that sled 12 herein has only a top troweling apron or skirt 15, as will be more fully discussed hereinafter.

The sled 12 is moved along the ditch 10 in the direction of the arrow 16. Such movement can be provided by any suitable means such as by attaching the free end of a cable 100 carried by a winch 101 (FIGS. 1 and 10) mounted at the front of the sled 12 to a deadman 99 or other appropriate fixed point spaced along the ditch from the sled 12. The winch 101 is driven by a motor 102 such as a gasoline engine or other appropriate power source that rotates the winch 101 through a clutch 103, speed reducer 104, and variable speed transmission 105. As the winch 101 is rotated it winds up the cable 100 on its drum, and with the forward end of the cable 100 fixed to a deadman positioned down the ditch 10 forwardly of the sled 12, the winding action pulls the sled 12 along the ditch 10 at a given rate.

The movement of the sled 12 along the ditch 10 insures that the ditch will have generally straight sidewalls 18 merging into a curved bottom wall 11. As shown in FIG. 2, these walls provide the sides and lower outer form portion for the conduit 19 which is formed in the ditch 10 by the apparatus of FIG. 1.

Referring now to FIG. 5, sled 12 is shown resting on the bottom of ditch 10. A pair of mandrels in the form of generally cylindrical axially aligned hollow drums 25 and 26 are mounted on the sled 12 under the skirt 15 in a manner forming a generally annular space 27 between the outer surfaces of the drums 25, 26 and the skirt 15, as well as walls 18 and the bottom portion 11 of the ditch 10. This space 27 is related to the minimum wall thickness of the conduit 19 to be formed in ditch 10. For example, such spacing may be on the order of 3½ to 6 inches or so (depending on the size conduit to be formed). Further, the dimensions of drums 25, 26 and sled 12 are also chosen depending on the dimensions of the ditch 10 and the size of the conduit to be formed therein. For example, drums 25, 26 may be on the order of 36 inches in over-all diameter and about 2 feet each in length.

As shown in FIGS. 1, 3 and 5, a hopper 17 is mounted on the support sled and communicates with an opening through the skirt 15 over the leading end of the drum 25. Cementitious material indicated by the arrow 20 is introduced into the annular space 27 through such hopper 17.

As can be seen in FIGS. 4, 5, 6 and 7, the leading edge of the first drum 25 includes means for throwing the cementitious material 20 introduced into hopper 17 about the side walls 18 and bottom portion 11 of the ditch 10 and thus within the annular space 27 (the sled 12 meanwhile being moved through ditch 10 in the manner discussed above and in the aforementioned patents). As best shown in FIG. 6, such means may include a plurality of packer wings 29 or the like, disposed at spaced intervals about the periphery of the front face 30 of the leading drum 25. These wings 29 may include one or more apertures therein so they may be bolted as by bolts 32 at one or more positions on the face 30. Apertures 31 may be elongated for lateral adjustment, too, if desired. That is, the distance X in FIG. 6 by which the wings 29 extend beyond the periphery of drum 25 may be varied. Wings 29 are shown in side view in FIG. 7 and thus are configured to "scoop" the cementitious material 20 and throw the cementitious material into space 27 and against both the sides 18 and bottom portion 11 of the ditch 10 as well as the top troweling skirt 15 carried by sled 12. Preferably, such wings 29 are spaced at intervals about face 30, as shown in FIG. 6. Two such wings 29 are shown spaced about twelve inches apart. Of course, such spacing may vary and the entire periphery of drum 25 may include such wings 29. Thus, wings 29 act as a "fan" or the like to pack the cementitious material introduced into hopper 17 as well as to continuously urge the cementitious material 20 to move rearwardly away from the upright rigid mounting wall 52 of the sled 12. As can be seen in FIG. 5, the distance Y between the leading edge of drum 25 and the leading wall 52 of sled 12 is preferably about 3½ to 6 inches or so in the example given. Further, a generally rigid annular ring 28 having the same diameter as the drum 25 and slots therein through which the packer wings 29 are received (as best shown in FIG. 7) may extend from and about the forward periphery of the drum 25 into close spaced relation from the leading wall 52 of the sled for preventing cementitious material 20 from jamming up between wings 29, the front of the drum 25 and the wall 52 of the sled 12.

Although drums 25 and 26 appear to be at relatively constant diameter in FIG. 5, preferably the drums 25, 26 taper downwardly and uniformly from the leading edge of drum 25 to the trailing edge of drum 26. Thus, for example, on a 36 inch machine, at the leading edge of drum 25, the overall diameter thereof, may be on the order of 36¾ to 36½ inches or so; however, drums 25 and 26 taper downwardly to an overall diameter of on the order of 36½ to 36 inches. Thus, the drums 25, 26 gently taper about ¼ to ½ inch over the overall length of the aligned drums 25, 26. When the drums vary in diameter or in length, these dimensions would, of course, also vary. Such taper serves to pack the cementitious material cast on the side walls 18 and bottom wall 11 of ditch 10 and trowels the interior thereof to make a better and smoother conduit. At the same time, both the taper of the drums and the inner wall of apron 15 of sled 12 trowel the top portion of conduit 19.

The means for rotating drums 25, 26 may be provided in any suitable manner. For example, one or more geared spaced spiders, or the like, (see spider 33 in FIG. 8) may be secured to the inner wall of each of the drums 25, 26 (one such spider disposed in drum 25 being shown in FIG. 8). The spider 33 includes a central hub 34 having a geared aperture 35 therein. As shown in FIGS. 1, 4 and 5, the gasoline engine 102 or other suitable motor (not shown) which may be electrically, hydraulically, or gas-operated, if desired, drives a shaft 37, which in turn drives suitable gears (not shown) disposed in gear box 38.

In any event, as best shown in FIG. 4, hollow shaft 39 is driven from the gears in box 38 for rotation in a counterclockwise direction. Shaft 39 enters drum 25 and includes a gear 40 thereon which engages geared aperture 35 of spider 33. Thus, as can be seen by arrow 41 in FIG. 5, drum 25 will rotate in a counterclockwise direction. A second drive shaft 42, also driven from gear box 38, is disposed internally of hollow shaft 39 and extends therethrough into fixed engagement, by any suitable means, at point 43, to drum 26. Of course, instead of being fixedly engaged to drum 26, a second spider 33 may be provided in drum 26 as in drum 25. Suitable gearing is used in gear box 38 to reverse the direction of rotation of drum 26 with respect to drum 25. Thus, as seen by arrow 44 in FIG. 5, when shaft 42 is rotated in the opposite direction from shaft 39, drum 26 rotates in a direction opposite to that of drum 25. Finally, suitable bearing members 46 may be provided to stabilize shaft 39 (and/or shaft 42, if desired).

The drums 25, 26 are rotated at a speed suitable to form the conduit 19. For example, a speed of rotation of about 5 to 45 r.p.m. may be used. Either or both drums 25, 26 may be varied in rotation or rotated at different speeds by changing the speed of the driving motor (which may be a variable drive motor) or varying the gearing means. Of course, the direction of rotation of drums 25, 26 may also be changed but in order to properly form top and bottom sections of conduit 19, their rotation must be in opposite directions.

The drums 25, 26 may be made of any suitable material. However, preferably the drums 25, 26 include an outer skin as for example, a skin of about 3/16 inch in thickness which will withstand abrasive wear. Steel-coated epoxy, rubber, plastic, fiberglass or any other suitable material may be used for the outer skin.

As can be seen in FIG. 4, the leading edge of drum 26 and the trailing edge of drum 25 are preferably rounded to prevent engagement of these corners with the soon-to-be formed conduit 19. The outer walls of drums 25 and 26 may be smooth faced but preferably include means for packing the cementitious material against the dirt in ditch 10 and the skirt member 15 of the sled 12 and for enhancing the heating effect of the circumferential frictional forces applied to the cementitious material at the inner surface of the annular volume.

Although any suitable cementitious mixture may be used, we prefer to use a 1 to 1½ inch maximum slump concrete mixture. "Slump" is a term of the art relating to the moisture content of the cement mixture. Also, if desired, the cementitious material may be premixed with a suitable material such as calcium chloride to make it set up more quickly.

For example, a suitable aggregate for making 48-to 120-inch diameter pipe would be one having a minimum diameter of about No. 200 screen and a maximum diameter of about 1½ inches. An aggregate having a minimum diameter of about 200 screen and a maximum diameter of about one-half inch would be suitable for 12 to 48-inch diameter pipe. One example of a suitable cementitious mixture would be a mixture of about 4,000 pounds. Of this mixture, about 564 pounds is cement; about 1,718 pounds is sand and 1,718 pounds is rock. Of course, these proportions could vary greatly and other mixtures would be suitable, depending on various factors, e.g., the size of the conduit, the strength desired, setting time, etc. It should also be noted that these proportions and the dimensions of drums 25, 26 and their degree of taper are not exact and may vary. It is usual in the art to form conduits which are referred to by a particular dimensional designation that is not exact. That is, the actual conduit formed may be slightly greater in inner and/or outer diameter than that referred to.

If desired, as shown in FIGS. 10 and 11 and described in the aforementioned U.S. Pat. No. 3,534,449, one or more vibrators, such as vibrators 55 through 57, may be provided to vibrate the cementitious material 20 to aid in properly disposing it. The vibrating effect may be obtained from electric vibrators or from hydraulic vibrators operated by motor 102 (or a separate motor, if desired). If electric vibrators are used, the electrical power may be taken from a generator driven by the motor 102 (if motor 102 is not electric). As shown in FIG. 10, the motor 102 may, in the alternative, drive a suitable pump 58 that draws liquid from a reservoir 59 and forces it through a valve 60 connected to vibrators 55 through 57, if hydraulic vibrators are used. The valve 60 is operated to control the frequency of the vibrators, depending on the consistency of the cementitious material 20. Thus, vibrators 55 through 57 are preferably connected by any suitable means below hopper 15 as shown in FIG. 9, if desired. Such vibrators both keep the cementitious material moving through the hopper 15 and make it flow properly. Conventional sintron vibrators may be used, located as low as possible in sled 12. Conventional spud vibrators may also be used, if desired.

It may be desirable to aid the flow of cementitious material 20 into the space 27. Such aid may be provided by a pair of tamper mechanisms 61 fixed to the sled 21 close to each outer wall of sled 12 and below the hopper 15, as shown in FIG. 9, each such tamper mechanism including a motor 62 fixed relative to the sled 12 on each side thereof. Such tamper means are disclosed in detail in the aforementioned U.S. Pat. No. 3,534,449.

In operation, cementitious material 20 is introduced into the hopper 17 onto the upper and side surfaces at the forward end of drum 25 and flows toward the space Y (FIG. 5) occupied by packer wings 29 as sled 12 is moved in the direction of arrow 16 (FIG. 1) through ditch 10. The packer wings throw or continuously urge the cementitious material 20 rearwardly of the wall 52 against the inner surface of skirt 15 of sled 12 and between the outer walls of drums 25, 26 and bottom portion 11 of ditch 10 (which form the annular space 27) as the drum 25 is rotated. The drum 25 packs the cementitious material 20 against the ground or dirt in ditch 10 and the inner surface of the troweling skirt or apron 15. The opposite rotation of drum 26 trowels the interior of conduit 19 and smooths out the surface thereof. In addition, the drum 26 assists in forming (together with skirt 15) the top of the completed conduit 19. The counter rotation of the drums 25, 26 adds frictional heat to the cementitious material, which assists in setting the cementitious material.

Thus, as can be seen in cross-section in FIG. 2, a conduit 19 is formed with smooth internal walls, yet without the necessity of external aids, such as internal forms or the like. Such forms raise problems in both installation and removal, and leave unsightly wall sections on the internal wall of such conduits. Also, it should be noted that the haunch portion 73 at the upper portion of the completed conduit 19 (see FIG. 2) is appreciably greater than the haunch portion resulting from known prior art techniques (compare FIG. 2 with FIG. 7 in U.S. Pat. No. 3,534,449). This gives added strength and rigidity to the completed conduit 19. Accordingly, the skirt 15 should be configured to provide for this, as shown in FIG. 3. Skirt 15 should be of a material strong enough to withstand pressure from the drums 25, 26 when compacting the cementitious material.

As disclosed in U.S. Pat. No. 3,534,449, the sled 12 may be equipped with a track or the like to assist in the moving of sled 12 in ditch 10. The sled 12 thus, in any event — with or without rolling means — slides along the walls of ditch 10 via winch 101 and cable 100. A complete circle of conduit is formed in the manner heretofore described. The engagement of sides 14 of sled 12 with the sides 18 and bottom portion 11 of ditch 10 maintains this desired circular relation. Cementitious material 20 is continuously fed into hopper 17 as sled 12 moves along ditch 10 and may be vibrated, by vibrators 55 to 57, and tamped, by tamper mechanisms 61, if desired.

Finally, after a desired length of conduit 19 has been formed, the sled 12 and the apparatus associated therewith may be removed from ditch 10 either manually or by suitable external means (such as a crane or the like). Also, sled 12 may be provided with hydraulically actuated legs or the like, as discussed in U.S. Pat. No. 3,534,449, to assist in its removal from the ditch 10.

Referring now to FIGS. 11 through 15, a preferred embodiment of this invention as actually used in forming cementitious conduit of the 42 inch diameter size in situ is shown. The support sled 112 and the hopper 117 are substantially identical to that of the embodiment described hereinabove. Similarly, the source of power and the mechanism for moving the support sled along the ditch and for driving the drums may be the same as that described in connection with the embodiment of FIGS. 1 through 10 and will not be further described.

However, according to this embodiment of the invention, the skirt 115 comprises a simple flat plate dimensioned to extend transversely across the ditch opening in a horizontal plane above the drums 125 and 126, as shown in phantom in FIG. 11, in top view in FIG. 12 and in cross-section in FIG. 13. More importantly, the relative axial dimensions of the drums 125 and 126 have been altered according to this embodiment of the invention and the means for continuously urging the cementitious material to move rearwardly of the upright wall 152 of the support sled 112 have been modified.

Thus, as best shown in FIGS. 11 and 13, the axial length of the drum 125 is much smaller than the axial length of the drum 126 although the drums have substantially the same diameter. Furthermore, a different means for continuously urging the cementitious material introduced into the hopper 117, as indicated by the arrow 120, rearwardly of the wall 152 within the annular space 127 is used.

Thus, as shown in FIGS. 13 and 14, the outer periphery of the first drum 125 is provided with a plurality of spaced, elongated, rectilinear, rod-like projections 129 which extend rectilinearly along the periphery of the drum 125 from adjacent one end thereof to adjacent the other end thereof at an angle to the axis of the drum 125. As best shown in FIG. 14, there are four of such projections 129 spaced 90° from each other about the periphery of the drum 125 and each extending at an appropriate angle with respect to the axis of the drum such that upon rotation of the drum in the direction indicated by the arrow 150 in FIG. 14 by means of the hollow drive shaft 139 acting through spider 133, the projections 129 will urge the cementitious material to move rearwardly of the wall 152.

As best shown in FIG. 13, a sealing means is provided between the wall 152 and the adjacent end of the drum 125. According to this embodiment of the invention, such sealing means comprises an annular sealing member 128 (shown in crosssection in FIG. 13) of resilient material such as heavy rubber or the like having its outer periphery bolted or otherwise fixed to the wall 152 and its inner periphery dimensioned to compressively receive the end of the drum 125 to thereby prevent the entry of cementitious material into the space between the end of the drum 125 and the wall 152.

According to this embodiment of the invention, the drum 125 is 42 inches in outer diameter and 5 inches in length. The peripheral wall of the drum is made of a suitable steel one-half inch thick and reinforced with a pair of spaced ribs extending peripherally about the inner surface thereof. The spider 133 is welded to the inner surface of the drum 125 between the ribs with its hub 134 keyed to the hollow shaft 139.

The projections 129 are made of ¾ inch square bar stock steel about 8¼ inches long extending at an angle of about 80° with respect to the axis of the drum 125.

According to this embodiment of the invention, the second drum 126 is actually a composite drum having a maximum diameter of 42⅝ inches and an axial length of 23 inches divided into three different contiguous sections. The first of such sections 136 at the end of the drum 126 adjacent the drum 125 is 3 inches in axial length and has an outer diameter of 41⅞ inches. Such first section 136 is provided with a plurality of peripherally spaced elongated projections 149 extending rectilinearly along such section from adjacent one end thereof to adjacent the other end thereof at an angle to the axis of the drum 126 similar to the projections 129 heretofore described in connection with the drum 125. However, the projections 149 extend at the opposite angle with respect to the axis of the drum 126 from the angle at which the projections 129 extend with respect to the axis of the drum 125 so that upon counterrotation of the drum 126 with respect to the drum 125, the projections 129 and 149 will cooperate in urging the cementitious material 120 to move rearwardly of the wall 152. Such first section 136 of the drum 126 may be made of an appropriate steel having a wall thickness of about ⅜ inch and the projections 149 may comprise lengths of bar stock steel having a thickness of ½ inch and a height of ¾ inch welded or otherwise mounted on the peripheral surface of the section 136.

The second section 137 of the drum 126 is approximately 5 inches in axial length and is shown in cross-section in FIG. 15. As best shown in FIG. 15, the wall of the section 137 comprises a plurality of overlapping arcuate plates with one end of each plate extending under and the other end extending over the plates adjacent thereto. Such arcuate plates are made of ⅜ inch thick stock of an appropriate steel and are rigidly interconnected to each other in such a way that each plate provides a sector increasing in outer diameter from 41⅞ inches at one end thereof to 42⅝ inches at the other end thereof. Thus, when the drum 126 is counter-rotated in the direction indicated by the arrow 151 in FIG. 15 from the direction of rotation of the drum 125 indicated by the arrow 150 in FIG. 14, the plates of which the section 137 of the drum 126 is made will trowel the inner surface of the cementitious material forcing it outwardly to its maximum diameter against the skirt 115 and sides and bottom of the ditch in which the conduit is being formed. As best shown in FIG. 15, the section 137 of the drum 126 may be reinforced by axially extending ribs spaced about the inner periphery thereof at the overlapping joints between the plates of which the section 137 is made.

Finally, the third section 138 of the drum 126 has a smooth exterior wall which tapers from a maximum diameter of about 42½ inches at the end thereof adjacent the section 137 to a minimum diameter of about 42⅜ inches at the free end thereof. The function of this section of the drum 126 is to enhance the curing of the cementitious conduit in situ through the application of frictional forces to the inner surface thereof in addition to the frictional forces applied by the prior section (137 in particular), which frictional forces tend to produce heating and consequent curing of the cementitious material.

As best shown in FIG. 11, the free end of the drum 126 is closed by a face 130 or transverse wall having a central aperture 143 which is keyed to the second drive shaft 142 to provide for the counterrotation of the drum 126. In addition, a further central aperture 143 (FIG. 15) may be provided in the face 130 (FIG. 15) closing the end of the drum 126 adjacent the drum 125 and also keyed to the shaft 142 in order to provide additional mechanical stability in the drum 126 and aid counterrotation thereof. Finally, a second seal means 148 shown in cross-section in FIG. 13 and comprising an annulus of resilient material having its inner periphery bolted or otherwise fixed to the face of the drum 126 adjacent the drum 125 and its outer periphery in engagement with the inner surface of the drum 125 may be provided in order to prevent cementitious material from entering into the space between the drums 125 and 126. It will be understood that any cementitious material entering the space between the drums 125 and 126 or between the drum 125 and the wall 152 will eventually take a permanent set and build up sufficiently to contribute friction opposing the rotation of the drum and requiring frequent cleaning.

The rate at which the drums 125 and 126 are rotated is dependent upon the rate at which the sled 112 is moved along the ditch. It will be understood that the drums 125 and 126 must be rotated fast enough so that the cementitious material 120 introduced into the hopper 117 will be continuously urged to move rearwardly of the wall 152 by the projections 129 and 149 on the drums 125 and 126, respectively, at a rate at least equal to the rate at which the sled 112 is moved along the ditch. If the hopper 117 is always kept entirely full of cementitious material, then the projections 129 and 149 will both insure the distribution of such cementitious material about the entire periphery of the conduit which is in formation and should simultaneously function to continuously urge the cementitious material to move rearwardly of the wall 152 at a rate which is substantially equal to the rate at which the sled 112 is moved along the ditch.

It can be seen from the foregoing that we have provided a suitable method for forming conduits in situ in ditches or the like without the necessity for prior installations and subsequent removal of internal forms or the like. It is, of course, necessary that the cementitious material, which enters the annular volume defined about the drums in a more or less fluid state, be sufficiently cured or "set" by the time it leaves such annular volume as to be fully self-supporting. Thus, the cementitious material must become more rigid as it moves along the annular volume relative to the drums. For this reason, the means for urging the cementitious material to move rearwardly of the rigid wall of the sled must be confined to a forward portion of the drums.

It has been found that it is best to confine the means which urge rearward movement of the cementitious material to less than the first one-third or so of the combined axial length of the drums and in no event should such means extend for more than one-half of such combined axial length since it would tend to be jammed by the cementitious material as it becomes more rigid. The combined length of the drums must of course be sufficient to enable a given cementitious material to become self-supporting and is thus a function of the composition of the material and the heating effects of the frictional forces applied thereto by the drums.

While we have described preferred embodiments of suitable apparatus for practicing our method, it will be understood that various modifications in the specific structure of the apparatus for practicing our method may be made so long as the essential features thereof are retained. It is believed that those skilled in the art will make modifications of and additions to the preferred embodiments of the apparatus described hereinabove without departing from the essential features thereof required to practice our method.

What is claimed is:

1. The method of continuously forming smooth walled concrete pipe in situ in a ditch or the like comprising the steps of:
   a. defining an elongated volume of generally annular cross-section having a cylindrical inner surface within said ditch with the axis of elongation of the annular volume extending along said ditch and with one end of said annular volume closed and the other end thereof open;
   b. introducing a solidifiable cementitious material into said annular volume at the closed end thereof;
   c. continuously urging said solidifiable cementitious material to move toward said open end of said annular volume at a rate at least as great as and substantially equal to a given rate by applying frictional forces including components acting in one circumferential direction and components acting in the axial direction toward said open end of said annular volume to said cementitious material in a first portion of said annular volume immediately adjacent said closed end thereof and having an axial length less than about one-half the axial length from the closed end to the open end of said annular volume; and simultaneously, d. moving said annular volume along said ditch at said given rate with the closed end of said annular volume preceding the open end thereof and e. applying frictional forces in the second circumferential direction opposite said one circumferential direction to said cementitious material at the inner surface of said annular volume throughout a second portion of said annular volume comprising the remaining length thereof.

2. The method of forming smooth walled concrete pipe in situ as claimed in claim 1 wherein said step of applying frictional forces in said second portion of said annular volume includes the application of frictional forces having components acting in the axial direction toward said open end of said annular volume in a part of the axial length of said second portion of said annular volume immediately adjacent said first portion thereof, the total of the axial length of said part of said second portion with the axial length of said first portion being less than about one-half the axial length of said annular volume.

3. The method of forming smooth walled concrete pipe in situ as claimed in claim 2 wherein said step of continuously urging said solidifiable cementitious material to move toward said open end of said annular volume is carried out by applying frictional forces including components acting in the axial direction toward said open end substantially throughout the length of said first portion of said annular volume.

4. The method of forming smooth walled concrete pipe in situ as claimed in claim 1 wherein said step of applying frictional forces in said second circumferential direction in said second portion of said annular volume includes the step of varying the amount of said forces about the periphery of said annular volume throughout a part of the axial length of said second portion of said annular volume.

5. The method of forming smooth walled concrete pipe in situ as claimed in claim 1 including the additional step of applying vibratory forces to said cementitious material in said annular volume.

6. The method of forming smooth walled concrete pipe in situ as claimed in claim 1 including the step of decreasing the amount of force applied in said second circumferential direction in said second portion of said annular volume along the length of at least a terminal part of said second portion of said annular volume.

7. The method of forming smooth walled concrete pipe in situ as claimed in claim 1 wherein the application of frictional forces including components acting in the axial direction toward said open end of said annular volume is limited to less than one third of the axial length of said annular volume.

8. The method of forming smooth walled concrete pipe in situ as claimed in claim 2 wherein the total of the axial length of said part of said second portion with the axial length of said first portion in which frictional forces having components acting in the axial direction are applied is less than one third of the axial length of said annular volume.

9. Apparatus for continuously forming smooth walled concrete pipe in situ in a ditch or the like comprising:

a. means defining an elongated volume of generally annular cross-section having a cylindrical inner surface within said ditch with the axis of elongation of said annular volume extending along said ditch and with one end of said annular volume closed and the other end thereof open;

b. means for introducing solidifiable cementitious material into said volume at the closed end thereof;

c. means continuously urging said solidifiable cementitious material to move toward said open end of said annular volume at a rate at least as great and substantially equal to a given rate including means for applying frictional forces to said cementitious material having components acting in one circumferential direction and components acting in the axial direction toward said open end of said annular volume in a first portion of said annular volume immediately adjacent said closed end thereof and having an axial length less than about one-half the axial length from the closed end to the open end of said annular volume;

d. means for moving said annular volume along said ditch at said given rate with the closed end of said annular volume preceding the open end thereof; and e. means for applying frictional forces in the second circumferential direction opposite said one circumferential direction to said cementitious material at the inner surface of said annular volume throughout the remaining portion of the length of said annular volume.

10. Apparatus for continuously forming cementitious conduit in situ in a ditch or the like comprising:

a. a movable support means slidably received on the sides and bottom of said ditch;

b. a drive shaft mounted on said movable support means and projecting therefrom within and along said ditch;

c. a first cylindrical member of given length and external diameter rotatably mounted on said movable support means coaxially with said drive shaft;

d. a second cylindrical member having a length at least equal to said given length and a maximum external diameter at least equal to said given external diameter of said first cylindrical member mounted on said drive shaft coaxially therewith with one end thereof close spaced from the adjacent end of said first cylindrical member;

e. a generally horizontal skirt member mounted on said movable support means and dimensioned to close the opening of said ditch above said first and second cylindrical members to thereby define with said cylindrical members and the sides and bottom of said ditch a volume of generally annular cross-ssection;

f. a rigid wall member mounted on said movable support means joined to said skirt member in close spaced relation from the free end of said first cylindrical member and slidably abutting the sides and bottom of said ditch to thereby close one end of said annular volume;

g. means for introducing solidifiable cementitious material into said annular volume through said skirt member adjacent said rigid wall means;

h. drive means mounted on said movable support means and coupled to said first cylindrical member and to said drive shaft for rotating said shaft and first cylindrical member in opposite directions with respect to each other about their common axis to thereby counterrotate said second cylindrical member with respect to said first cylindrical member;

i. means on the exterior surface of said first cylindrical member extending less than half the total axial length of said first and second cylindrical members for continuously urging said solidifiable cementitious material to move away from said rigid wall member and toward said open end of said annular volume at a rate at least equal to a given rate upon rotation of said first cylindrical member;

j. means including the exterior surface of said second cylindrical member for applying circumferential frictional forces to said cementitious material at the inner surface of said annular volume; and k. means associated with said movable support means for moving said movable support means along said ditch at said given rate with the closed end of said annular volume preceding the open end thereof.

11. Apparatus as claimed in claim 10 wherein said means on the exterior surface of said first cylindrical member for continuously urging said cementitious material to move away from said rigid wall member comprises a plurality of rigid members spaced from each other about the periphery of said cylindrical member at the end thereof adjacent said rigid wall, each of said rigid members being rigidly mounted on said first cylindrical member and each including a surface projecting a short distance beyond the outer periphery of said first cylindrical member and extending along said outer periphery of said first cylindrical member in the direction of rotation thereof at an angle with respect to the axis of said first cylindrical member.

12. Apparatus as claimed in claim 11 including means rotatably sealing the adjacent end of said first cylindrical member to said rigid wall to prevent the passage of cementitious material therebetween.

13. Apparatus as claimed in claim 12 wherein a portion of said drive shaft adjacent said support means is coaxially surrounded by a hollow drive shaft mounted on said support means and said first cylindrical member is coaxially mounted on said hollow drive shaft for coupling to said drive means by said hollow drive shaft.

14. Apparatus as claimed in claim 13 wherein said means rotatably sealing said first cylindrical member to said rigid wall comprises a flanged face on said first cylindrical member adjacent said rigid wall, the flange of said flanged face extending into close proximity to said rigid wall and having a plurality of slots therethrough spaced about the periphery thereof; and said rigid members for continuously urging said cementitious material to move away from said rigid wall comprise a plurality of packer wings mounted on said face of said first cylindrical members and each extending through a different one of said slots through said flange a short distance beyond the outer periphery of said first cylindrical member.

15. Apparatus as claimed in claim 14 wherein said packer wings are adjustably mounted on said face whereby both the extent of said wings beyond the outer periphery of said first cylindrical member and their angularity with respect to the axis thereof may be varied.

16. Apparatus as claimed in claim 15 wherein said wings are configured in a manner having a first portion extending generally parallel to the plane of said face and an integral second portion extending from said first portion at an angle to said plane outwardly of said periphery of said first cylindrical member, the free edge of said second portion of said packer wings being generally arcuate.

17. Apparatus as claimed in claim 11 wherein the external diameter of at least said second cylindrical member decreases along at least a terminal portion thereof to provide a smooth exterior surface tapering to a minimum diameter at the free end of said second cylindrical member.

18. Apparatus as claimed in claim 11 wherein each of said cylindrical members includes an outer skin surrounding a substantial portion thereof of an abrasion-resistant material.

19. Apparatus as claimed in claim 11 including vibrating means operatively connected to said support means for vibrating the cementitious material introduced into said annular volume.

20. Apparatus as claimed in claim 11 including tamping means operatively connected to said support means for tamping cementitious material into said annular volume.

21. Apparatus as claimed in claim 11 wherein each of said plurality of rigid members for continuously urging said cementitious material to move away from said rigid wall member comprises an elongated, generally rectilinear, rod-like member rigidly secured to the peripheral surface of said first cylindrical member and extending therealong with a side thereof projecting therefrom.

22. Apparatus as claimed in claim 21 wherein the axial length of said first cylindrical member is less than one-third of the axial length of said annular volume and said rod-like members extend from adjacent one end of said first cylindrical member to adjacent the other end thereof with no portion of one of said rod-like members when projected along said peripheral surface parallel to the axis of said first cylindrical member overlapping another of said rod-like members.

23. Apparatus as claimed in claim 22 wherein a portion of the axial length of said second cylindrical member immediately adjacent said first cylindrical member is provided with a second plurality of elongated, generally rectilinear, rod-like members spaced from each other about the outer periphery of said second cylindrical member and each secured thereto with a side thereof projecting therefrom, the axis of elongation of each of said second plurality of rod-like members extending at an appropriate angle with respect to the axis of said second cylindrical member to urge said cementitious material to move away from said rigid wall upon counterrotation of said second cylindrical member with respect to said first cylindrical member, the total axial length of said first cylindrical member and said portion of said second cylindrical member being less than one-half of the axial length of said annular volume.

24. Apparatus as claimed in claim 11 wherein a portion of the exterior surface of said second cylindrical member comprises arcuate sectors in cross-section, each of such sectors having a radius which decreases from a given maximum to a given minimum in the direction of rotation of said second cylindrical member.

25. Apparatus as claimed in claim 9 wherein said means defining said elongated annular volume comprises a pair of cylindrical members of substantially equal outer diameter arranged in end-to-end coaxial relation with one end of one of said cylindrical members at said closed end of said annular volume, said means for applying frictional forces in said one circumferential direction and said other circumferential direction comprises means for counterrotating said cylindrical members, and said means for urging said solidifiable cementitious material to move toward said open end of said annular volume comprises a plurality of rigid members spaced from each other about the periphery of said one end of one of said cylindrical members each including a surface projecting a short distance from said periphery and extending along said periphery in the direction of rotation thereof at an angle with respect to the axis of said cylindrical members.

* * * * *